(12) United States Patent
Poscher

(10) Patent No.: US 8,660,609 B2
(45) Date of Patent: Feb. 25, 2014

(54) METHOD AND SYSTEM FOR IP NETWORK ADMISSION CONTROL

(75) Inventor: Jens Poscher, Niederkruechten (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 809 days.

(21) Appl. No.: 12/678,198

(22) PCT Filed: Aug. 1, 2008

(86) PCT No.: PCT/IB2008/002029
§ 371 (c)(1),
(2), (4) Date: Mar. 15, 2010

(87) PCT Pub. No.: WO2009/034426
PCT Pub. Date: Mar. 19, 2009

(65) Prior Publication Data
US 2010/0189062 A1    Jul. 29, 2010

Related U.S. Application Data

(60) Provisional application No. 60/972,396, filed on Sep. 14, 2007.

(51) Int. Cl.
*H04B 1/38* (2006.01)
*H04M 1/00* (2006.01)
*H04B 7/00* (2006.01)

(52) U.S. Cl.
USPC ........... 455/560; 455/561; 455/562; 455/524; 455/525

(58) Field of Classification Search
USPC ............ 455/452.1, 403, 422.1, 550.1, 63.13, 455/63.1
See application file for complete search history.

(56) References Cited

U.S. PATENT DOCUMENTS

| | | | | |
|---|---|---|---|---|
| 6,832,088 B1 * | 12/2004 | Stumpert | ...................... | 455/445 |
| 7,089,011 B1 * | 8/2006 | Mangal | ......................... | 455/445 |
| 2003/0129988 A1 * | 7/2003 | Lee et al. | ...................... | 455/450 |
| 2009/0117906 A1 * | 5/2009 | Thomas | ........................ | 455/439 |

FOREIGN PATENT DOCUMENTS

| | | |
|---|---|---|
| WO | WO 03/055167 A | 7/2003 |
| WO | WO 2008/041929 A | 4/2008 |

* cited by examiner

*Primary Examiner* — Tilahun B Gesesse

(57) ABSTRACT

There is disclosed a manner of controlling traffic by admission control in a communication network such as one operable according to GSM standards. When a call setup request is received from an MS, the BSC forwards the request to an MSC, which selects a MGw that is accessible to the BSC via an IP backbone. When notified of the MGw selection, the BSC runs an algorithm to assess the transmission quality of the IP backbone toward the MGw. The BSC then determines whether to reject the call setup request depending on whether the quality level is acceptable as determined by the algorithm. If the call setup proceeds, the MGw may run a similar algorithm to assess the quality of the IP backbone toward the BSC. The BSC and MGw may also check their own bandwidth limitations prior to running their respective algorithms.

22 Claims, 5 Drawing Sheets

METHOD AND SYSTEM FOR IP NETWORK ADMISSION CONTROL

CROSS REFERENCE TO RELATED APPLICATION AND CLAIM OF PRIORITY

This application is related to, and claims the benefit of the filing date of U.S. Provisional Patent Application Ser. No. 60/972,396, which was filed on 14 Sep. 2007, and which is incorporated herein by reference.

TECHNICAL FIELD

The present invention is directed, in general, to the operation of network communication systems and, more specifically, to a manner of implementing admission control in a communication network, such as a GSM (Global System for Mobile Communications) network, that utilizes an IP (Internet protocol) network backbone.

BACKGROUND

A communication system, in general, provides for voice and perhaps data communication between two or more parties. Generally speaking, every communication system must have a way for subscribers to access the system, including the equipment used by the subscribers themselves, and a core network for transporting voice and data traffic from one access location to another. Some type of signaling system must also be in place to facilitate setting up and ending calls, and for the provision of other call-related services.

In a standard wireline system, such as a PSTN (public switched telephone system) for example, subscribers use telephones are connected with stationary access points (for example, a phone jack) in a business or residence. The access point is connected, perhaps through intermediary devices, with a telephone company switching office. The switching office provides access to a hierarchically-arranged network of variously-sized lines and trunks, interconnected with switching and other equipment, that route each call to its destination. When the caller initiates a call by picking up the telephone and dialing a number, a circuit is established through the network to the called party. The circuit remains dedicated to the call until it is completed, then the network resources used for the session are released for use on other calls.

In a mobile communication system, such a PLMN (public land mobile network), subscribers may and frequently do move from one geographic location to another. Instead of a telephone plugged into a jack, a subscriber wishing to make a call uses a MS (mobile station) with a relatively low-power radio transceiver to communicate over an air interface a nearby antenna. There are typically a large number of such antennas distributed over the network coverage area. Each of the antennas is connected with a core network for the routing and transmission of calls. A signaling system is also present in a PLMN so that calls may be set up and ended properly. The signaling system is also used to allow a mobile subscriber to switch from communicating with one antenna to another to allow for relocation even while a call is in progress.

Mobile communication systems are constructed and operating according to a set of standards and protocols. One type system is referred to as GSM (Global System for Mobile communication) and is used extensively throughout the world. Selected components of a typical GSM PLMN 10 are illustrated in FIG. 1. FIG. 1 is presented for the purpose of introducing various network components and will be described only briefly. MSs (mobile stations) access the PLMN 10 through a nearby antenna over an air interface. In the example of FIG. 1, there is shown three BSSs (base stations systems referred to as 16, 17, and 18. BSS 16 includes BSC (base station controller) 41, which is in communication with BTSs (base transceiver stations) 42 and 43. The BTSs include the actual antenna for communication and, as an example, MS 12 is depicted as communicating with BTS 42. Similarly, BSS 17 includes BSC 31, which communicates with BTS 32 and BTS 33, and BSS 18 includes BCS 35 and BTS 36. Here, BTS 36 is shown in communication with MS 14.

Communication between MS 12 and MS 14 is arranged when their respective BSS contacts an MSC with which they are in communication. As shown here, BSS 16 is in communication with MSC 20, and BSS 18 communicates with MSC 30. Through MSC 20 and MSC 30, the call between the two MSs can be arranged. During setup, the MSCs may consult the HLR 15, which tracks the identity and location of MS that belong to PLMN 10. Each MS registers periodically with a nearby BTS and their location may be reported to HLR 15 at that time. An MS from another PLMN may register as well, with their current location stored in a VLR (not shown) associated with each MSC, and reported to the HLR of their PLMN (also not shown).

Although only two MS are shown in FIG. 1, there are typically a large number. At times, the capacity of the network may be reached. In that event, access to the network must be limited. This may be done through admission control. For example, in the PLMN 10 of FIG. 1, voice transport in the interface between a BSC and its respective MSC (referred to sometimes as the "A interface") uses TDM (time division multiplexing). In TDM each transported frame has a number of time slots, and each time slot may be assigned to a particular call so that many calls may be handled by the same transmission channel. When there are no time slots left to assign, an incoming call request must be rejected.

It is becoming frequently common, however, for communication networks to utilize a packet-switched network, usually operable according to the IP (Internet protocol), to transport voice and other signals. A packet-switched network does not assign time slots, but rather breaks up transmissions into a number of packets of information, each of which is provided with a destination address and routed through the network. IP networks include a large number of routers and similar devices, but do not establish a fixed path for each transmission. Rather, each packet is routed individually, and the several packets of a given transmission may each take different routes through the network. An identifier associated with each packet enables the destination device to reassemble them to form the original transmission. Individual packets are sometimes lost, due to network congestion or equipment malfunction, and lost packets are sometimes re-sent upon request. In general, the small amount of information lost with each packet, which is sometimes recovered through retransmission, does not always affect the transported voice content significantly.

If too many packets are lost, however, the quality of the transmission may degrade. If the loss is attributable to network congestion, numerous requests for re-sending packets compounds the problem. As should be apparent, some form of admission control for such a network would be desirable. Since time slots or circuits are not assigned for the IP portion of the network (sometimes referred to as the IP backbone), however, traditional methods of admission control cannot be used.

This need is exacerbated where the A interface extends across the packet-switched network, since access control in this configuration cannot be imposed in the traditional fashion. The A interface may be extended in this fashion so that only one MGw is required for a call being carried across the network (see FIG. 2). Using only a single MGw, generally speaking, increases the capacity of the network without a large capital expenditure. The IP network may still become congested, however, with an accompanying degradation in quality. There is a need, therefore, for an admission control solution for use in communication networks that utilize an IP backbone.

SUMMARY

To address the above-discussed deficiencies of the prior art, it is a primary object of the present invention to provide a method and arrangement for implementing admission control in a communication network that utilizes an IP backbone.

In one aspect, the present invention is a method of admission control including the steps of receiving, in a BSC (base station controller), a call setup request from a MS (mobile station), notifying an MSC (mobile switching center) of the call setup request, selection, by the MSC, of a MGw (media gateway) for the call, determining, by the BSC, of the transmission quality towards the MGw through a packet-switched network, and determining whether to refuse the call setup request based on the determined transmission quality towards the MGw. The BSC may continually or periodically monitor the quality of transmission toward a number of MGws, perhaps all MGws to which it has access via the packet-switched network, in preparation for making the determination regarding a call setup request.

In some embodiments, the MGw, once selected, may also determine the transmission quality towards the BSC and make a determination on that basis whether to refuse the call setup request. If the call setup request is refused by the selected MGw, an alternate MGw may be selected. Transmission bandwidth limits may in some applications be imposed on either or both of the BSC and the selected gateway. In that case, the limited node may first determine whether the respective bandwidth limit has been reached, usually before determining whether to reject the call setup request based on transmission quality. Transmission quality is usually a function of packet loss rate in the relevant direction, but may also or instead consider other factors.

In another aspect, the present invention is a system for controlling traffic in a GSM communication network, the system including a BSC arranged to monitor transmission quality toward at least one MGw over an IP (Internet protocol) network, and further arranged to, upon receiving a call setup request, request selection of a MGw and to determine whether to refuse the call setup request based on transmission quality toward the selected MGw. The system further includes an MSC arranged to select a MGw upon receiving the request from the BSC and a MGw arranged to, upon being selected by the MSC, determine transmission quality toward the BSC, and further arranged to determine whether to refuse the call setup request based on transmission quality toward the BSC.

In yet another aspect, the present invention is a node, such as a BSC, for use in a communication network, the node being arranged to receive a call setup request, to request a MGw for handling the call, to receive a MGw selection, to determine transmission quality toward the selected MGw over an IP network, and to determine whether to refuse the call setup request based on the transmission quality toward the selected MGw. The determination of transmission quality preferably includes determining a packet loss rate for transmissions toward the selected MGw. The node may also determine whether it has reached a transmission bandwidth limit, if any, preferably prior to requesting selection of an MGw for handling the call.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 2 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged communications system.

The present invention is directed to the efficient use of network resources that, in turn, tends reduces the amount of resources required to support a given level of traffic. More specifically, the present invention facilitates the use of a single MGw (media gateway) for call completion using an A over IP interface. The present invention will now be explained in more detail.

Figure 1:
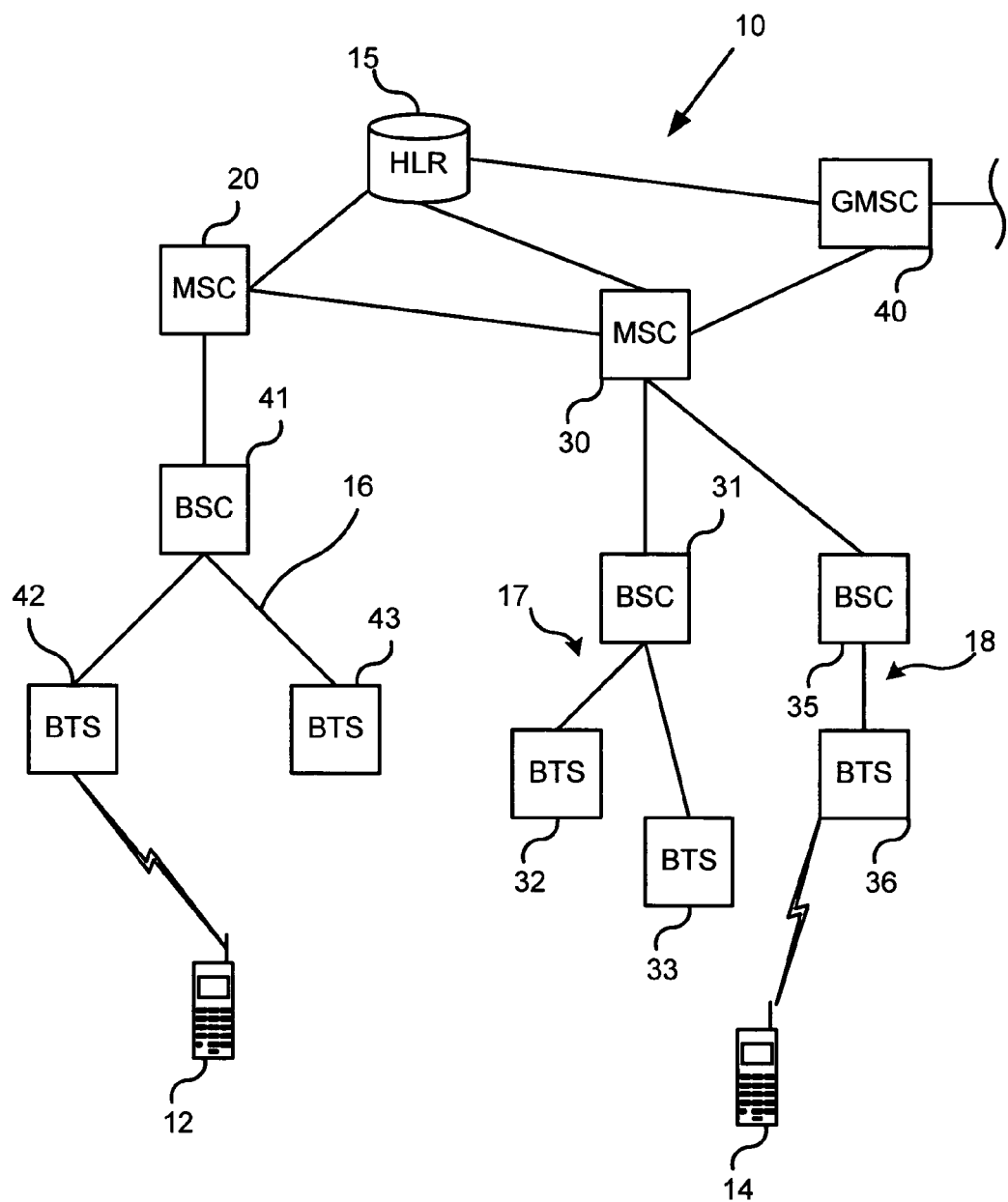
FIG. 1 is a simplified schematic diagram illustrating selected components of a typical GSM network.
Figure 2:
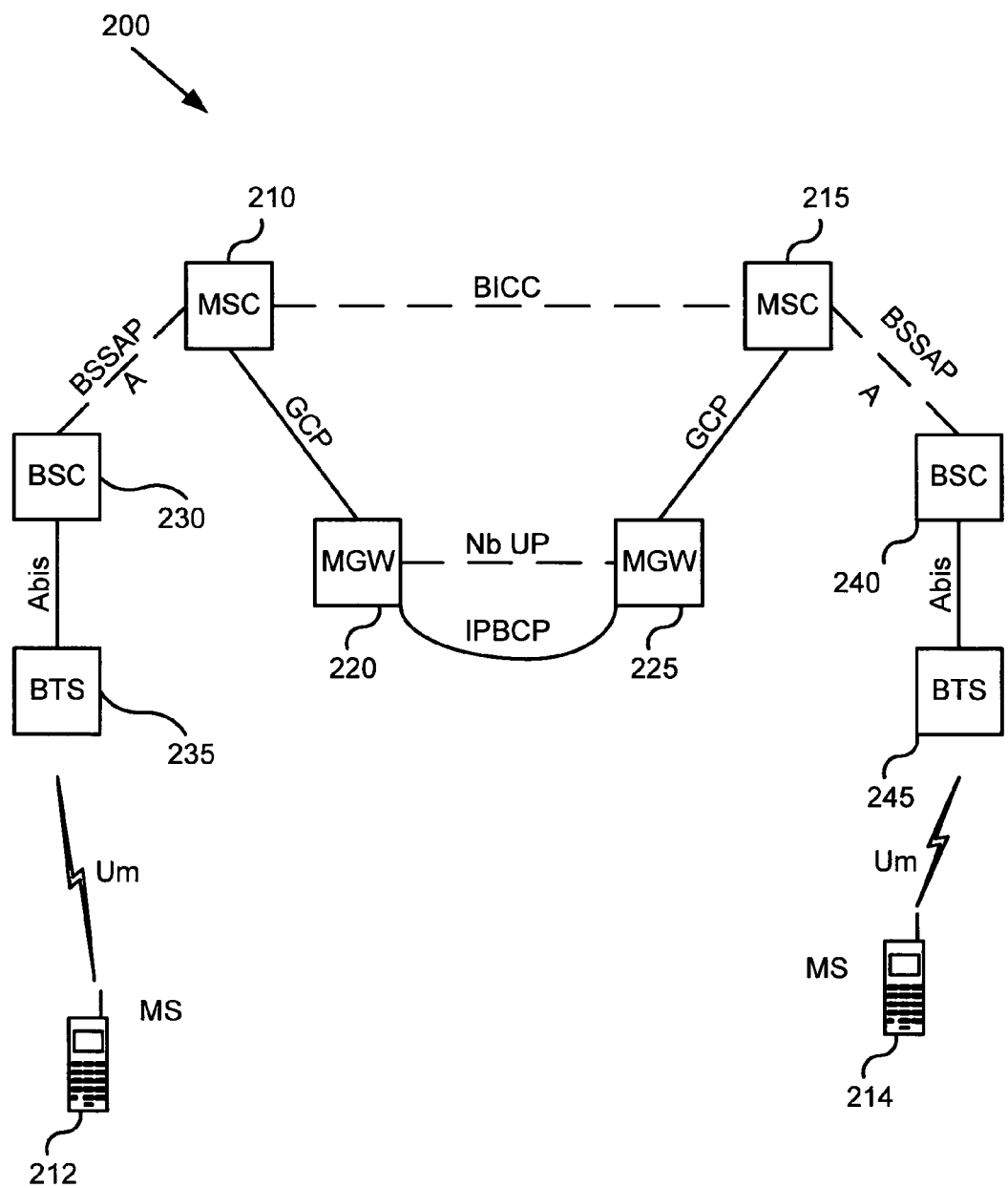
FIG. 2 is a simplified schematic diagram illustrating selected components of a GSM network in which an embodiment of the present invention may be implemented.

The present invention is advantageously implemented in a communication network such as a GSM network. FIG. 2 is a simplified block diagram illustrating selected components of a communication network 200 in which an embodiment of the present invention may be implemented, for example, when MS (mobile station) 212 attempts to place a call to MS 214. In this configuration, MS 212 contacts BTS (base transceiver station) 235 with a call setup request over an air interface referred to as the Um interface. BTS 235 in turn passes this request to the BSC (base station controller) 230 over the Abis interface.

When BSC 230 receives the call setup request, it sends a BSSAP (base station system application part) protocol message to MSC (mobile switching center) 210 over what is referred to as the A interface. In this configuration, an analogous arrangement is used between MSC 215, BSC 240, BTS 245, and MS 214. MCSs 210 and 215 communicate with each to set up the call other using the BICC (bearer independent call control) protocol. Each of them selects a MGw for handling the call, here MGw 220 and MGw 225, which use between them the NbUP (Nb (interface) user plane) protocol. IPBCP (IP bearer control protocol) is used for bearer establishment.

In this configuration, however, the use of two MSCs and two MGws for setting up the session between MS 212 and MS 214, which is not atypical, is presumed. In many instances nowadays, however, a savings in resources may be attained by employing only a single media gateway. This is done by extending the A interface over an packet-switched network, so that communication over the A interface takes place between the BSC attempting to set up a call and a single MSC and MGw. This will be more clearly apparent with reference to FIG. 3.

Figure 3:
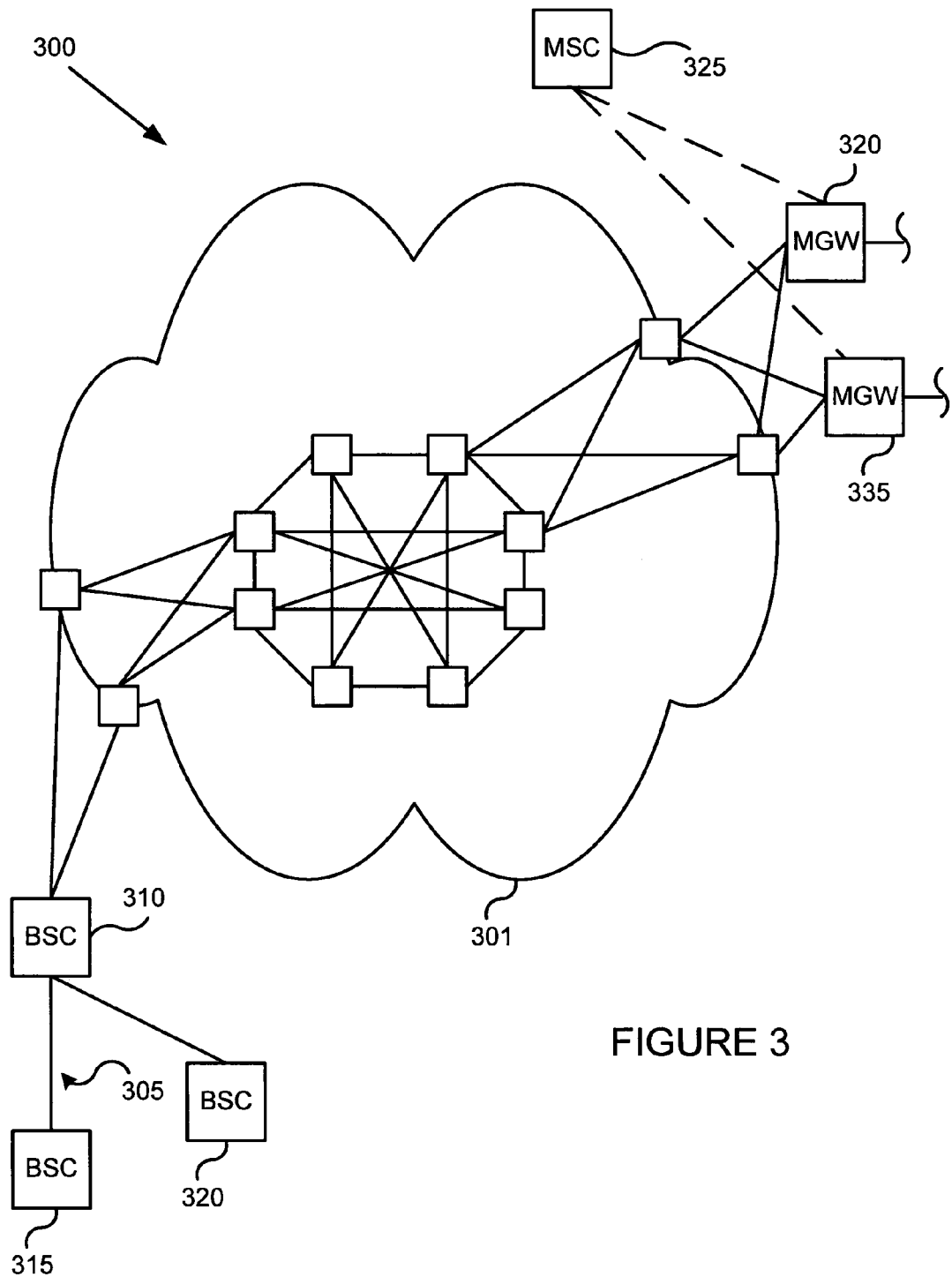
FIG. 3 is a simplified schematic diagram illustrating selected components of a communication network operable according to an embodiment of the present invention.

FIG. 3 is a simplified schematic diagram illustrating selected components of a communication network 300 operable according to an embodiment of the present invention. Communication network includes an IP backbone 301. Note that numerous nodes of IP backbone 301 are represented in FIG. 3 but without specific reference or indication of their nature. For the purposes of describing the present invention, it is simply presumed that they are represent the constituent parts of IP backbone 301 that are used to route packet-based communications.

On one side of the IP backbone 301 is a BSS (base station system) 305. BSS 305, in this illustration, includes a BSC 310 and two BSTs 315 and 320. BSS 305 (specifically BSC 310) may communicate via the IP backbone 301 with one or more MSCs. The interface between a BSS and an MSC or MGw is called the A interface, and one that includes an IP backbone is sometimes referred to as an AoverIP interface. In FIG. 3, for example, BSC 310 may communicate with MSC 325. An AoverIP interface established between them may be used for sending messages related to call setup, for example.

MSC 325 is in communication with two MGws (media gateways), MGw 330 and MGw 335. Packets from BSC 310 may be sent to either MGw 330 or MGw 335 on the IP layer, also over the AoverIP interface. As this is being done, the BSC 310 monitors the average packet loss towards each of MGw 130 and MGw 135, and towards any other similar MGw or similar node (not shown). Other measures of the transmission quality between the BSC and a given MGw may be made as well, for example the presence and amount of jitter or packet reordering. These quality indicators may be monitored continually or periodically. In either case a value associated with the transmission quality is saved for future reference when a call setup request is received, as explained in more detail below.

Figure 4:
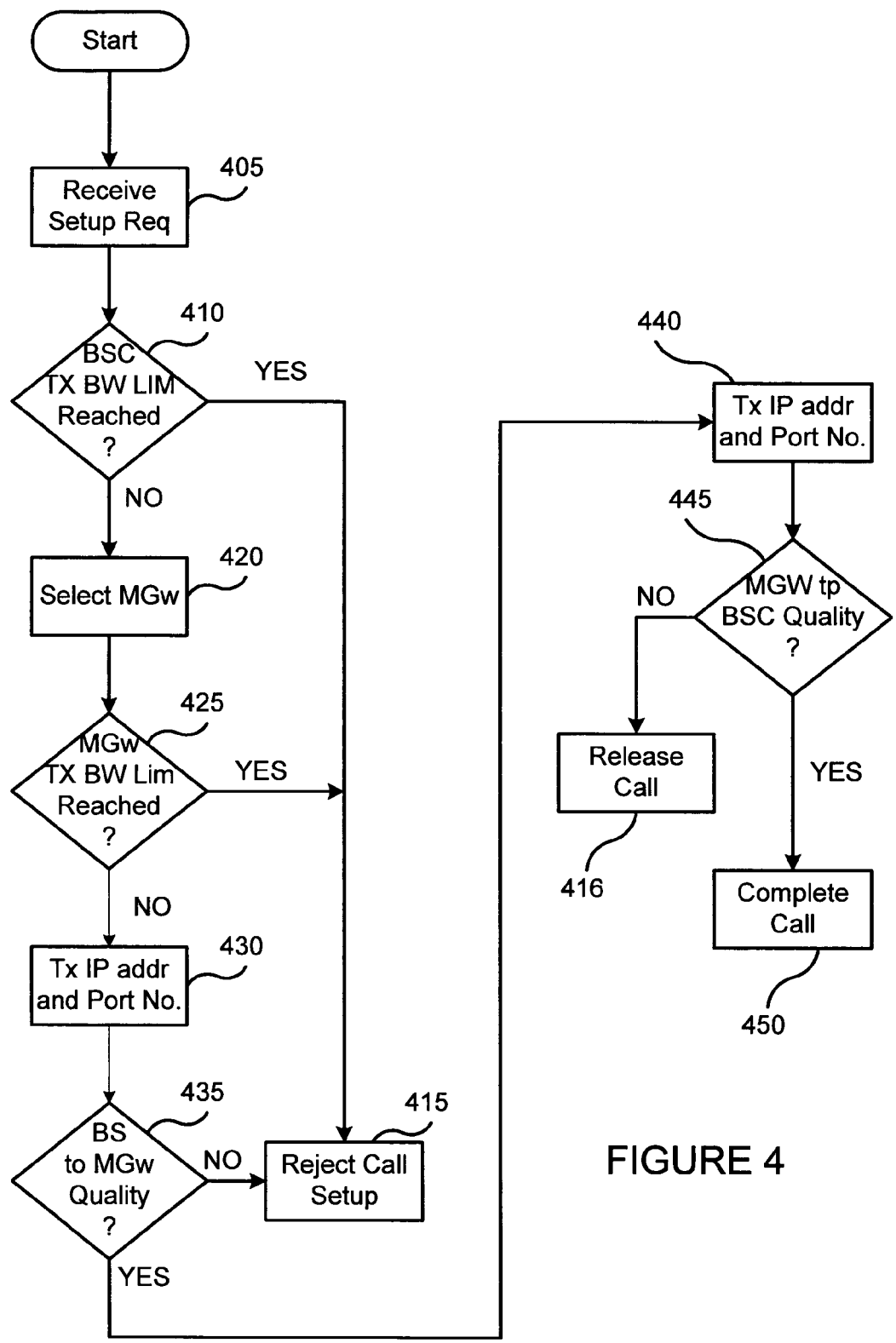
FIG. 4 is a flow diagram illustrating a method of facilitating access control according to the present invention.

FIG. 4 is a flow diagram illustrating a method 400 of facilitating access control in a GSM communication network. Note that the method may also be implemented in other similarly-arranged networks as well. At Start, it is presumed that the hardware and software necessary to performing the method is available and operational. The method then begins when a call setup request is received (step 405). Upon receiving the request, the BSC determines whether a predetermined bandwidth limit on the transmission of calls over the A interface has been reached (step 410). This predetermined bandwidth limit may be static (unchanging or subject only to change by a network operator) or dynamic, that is continually adjusted or adjustable based on predetermined factors.

If the BSC bandwidth limit has been reached (met or exceeded), then the call setup request is denied (step 415). If it has not been reached, then a MGw is selected (step 420). In accordance with the present invention, this may be any MGw in communication with the IP backbone, but is of course it is selected based at least in part on the destination specified in the call setup request. In most applications, the BSC communicates with the MSC (not separately shown) and the MSC selects the MGw. When a MGw has been selected, the MSC seizes a termination with the selected MGw (step not shown).

The selected MGw then determines whether a predetermined bandwidth limit on the transmission of calls over the A interface toward the BSC has been reached (step 425). As with the BSC, this predetermined bandwidth limit may be static or dynamic. If the MGw bandwidth limit has been reached (met or exceeded), then the MGw rejects the call setup request (step 415). In one embodiment, the call setup request is simply rejected entirely. In another embodiment (not shown) a refusal by one MGw leads to the selection of another by the MSC, if the other is appropriate for routing the call. In yet another embodiment (also not shown), a TDM-based connection to a MGw may be established if the a selected MGw rejects the call setup request. If the MGw bandwidth limit has not been reached, an IP address and port number for the call is transmitted from the MGw to the BSC that received the call setup request via the MSC that selected the MGw (step 430).

In the embodiment of FIG. 4, when the BSC receives the MGw's IP address and port number, it determines whether the quality of transmissions toward the selected MGw fall within an acceptable range (step 435). In a preferred embodiment, this quality determination includes determining whether the observed packet loss of packets transmitted by the BSC the A interface falls beyond a certain threshold. Preferably, the BSC monitors packet loss to all MGws that it may access over the IP network. This may be done continually or on a periodic basis. A quality value for each potential A interface may then be stored for reference when a call setup request is received. Note that other parameters aside from packet loss may be included in the determination of this step as well.

If the BSC determines that the transmission quality does not fall within an acceptable range, then the call setup request is rejected (step 415). If the transmission quality toward the MGw is acceptable, then the BSC accepts the call and provides the MGw, via the MSC, with an IP address and port number for the BSC side of the A interface (step 440).

In the embodiment of FIG. 4, the MGw then determines whether the quality of transmission toward the BSC fall within an acceptable range (step 445). This determination may include determining the packet loss rate or other factors. If the quality of transmission does not fall within an acceptable range, the call is released (step 416). Note that the term "released" is used here as the call was (provisionally) accepted by the BSC. For simplicity however, this will be considered equivalent to "rejecting" the call setup request. If, on the other hand, the transmission quality is acceptable, the call is completed (step 450).

Figure 5:
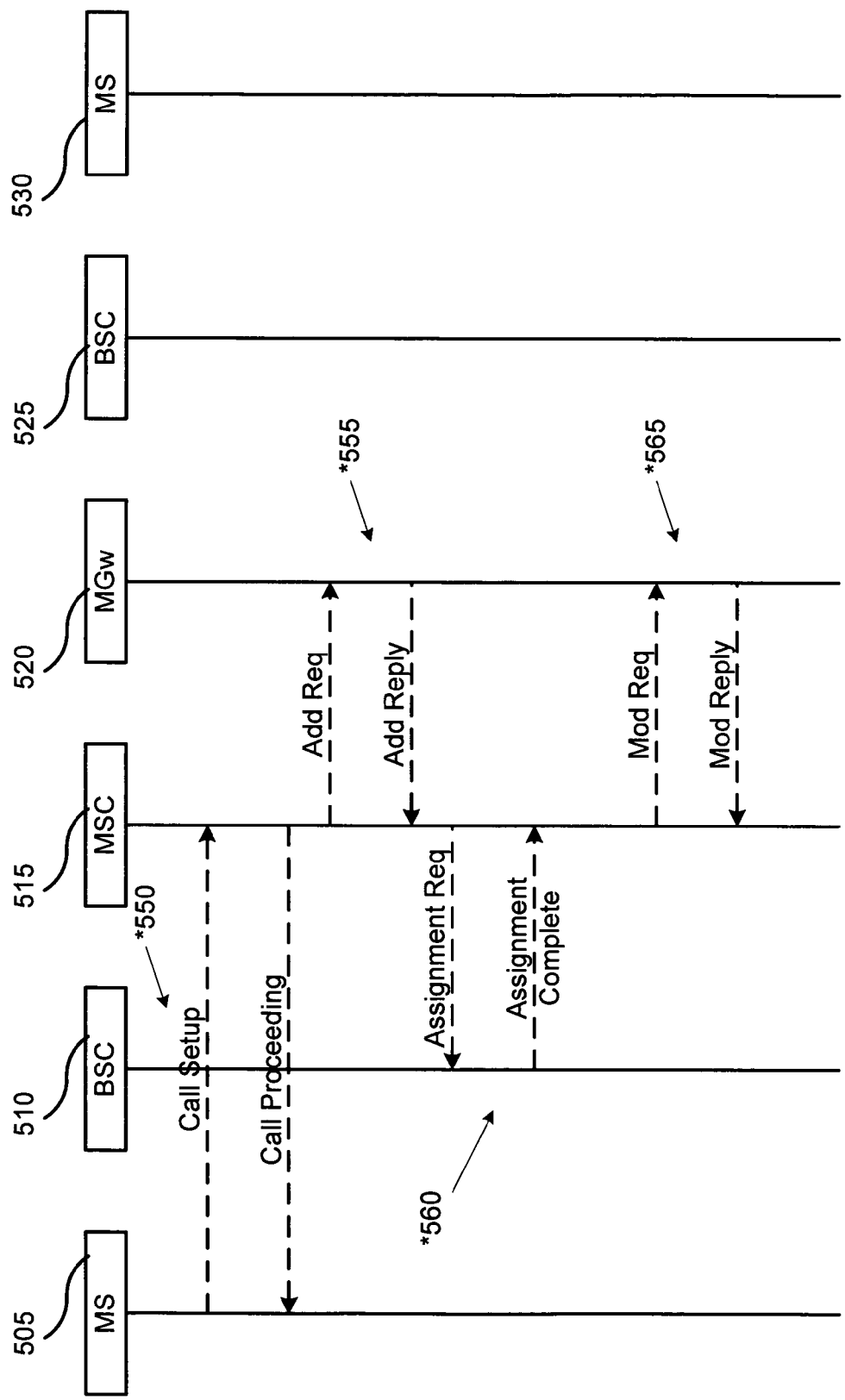
FIG. 5 is a message flow diagram illustrating the messaging used to set up a call subject to admission control according to an embodiment of the present invention.

FIG. 5 is a message flow diagram 500 illustrating the messaging used to set up a call with admission control according to an embodiment of the present invention. This Figure illustrates, among other things, the trigger points for MBAC (measurement based admission control) and SAC (session admission control) checks, which were generally alluded to in reference to FIG. 4. Note that this illustrates the messages used according to this embodiment of the present invention. There may be and frequently are other messages involved in call setup.

In the embodiment of FIG. 5, the message flow diagram represents includes selected communication network nodes, namely, MS 505, BSC 510, MSC 515, and MGw 520. MS 505 is attempting to set up a call with MS 530, which, if successful, will be conducted through BSC 525.

When an MS, such as MS 505 wishes to set up a call, for example to MS 530, it establishes contact with the communication network BSC, in this case BSC 510, via a BST (not shown in FIG. 5). The BSC 510 then transmits a BSSAP SETUP message to MSC 515 over the A interface. In accordance with this embodiment of the present invention, however, prior to sending the BSSAP SETUP message, the BSC runs a SAC (session admission control) algorithm ***550 to determine if it is permitted to allocate additional bandwidth for the call. As explained above, if the BSC transmission bandwidth limit has been reached, the call will be rejected. The BSSAP SETUP message is transmitted only if the additional bandwidth allocation is allowed. For the purposes of illustrating the message flow of FIG. 5, however, it will be assumed that the SAC algorithm (and the subsequent checks as well) allow the call to be set up.

When the BSSAP SETUP message is received by the MSC 515, it is acknowledged using a CALL PROCEEDING message. The MSC 515 then selects a MGw to handle the call; in this embodiment, MGw 520. MSC 515 then sends a GCP (gateway control protocol) ADD REQ command to MGw 520 to add a termination for the call.

In this embodiment, receipt of the ADD REQ command is acknowledged by the MGw 520, but only if additional bandwidth for the call may be allocated. To determine this, an SAC algorithm ***555 is executed in the MGw 520. If additional bandwidth for the call is permitted (as is presumed here), then the MGw 520 sends the acknowledgement ADD REPLY, including the IP address and port of the A interface termination. The MSC 515 then forwards the MGw termination and A interface IP address and port number to the BSC 510 in an ASSIGNMENT REQUEST message.

After receiving the ASSIGNMENT REQUEST message, the BSC 510 executes an MBAC (measurement based admission control) algorithm ***560 using the IP address of selected MGw 520 to determine if the quality of the IP backbone is currently sufficient. As mentioned above, this determination may be made based on a previously-measured packet loss rate toward MGw 520. If so, an ASSIGNMENT COMPLETE message is sent from the BSC to the MSC 515. The ASSIGNMENT COMPLETE message includes the IP address and port of the BSC 525 termination.

The MSC then sends a GCP MOD REQ command including the IP address of port of the MGw. Upon receiving the MOD REQ command, the MGw 520 executes a MBAC algorithm ***565 to check the transmission quality toward BSC 510. If the quality of the IP backbone is currently sufficient, the call is established (not shown).

In this manner, the present invention provides for admission control in a communication network that accommodates extension of the A interface across a packet-switched network. This enables efficient operation of the network while utilizing fewer network resources for each call, thereby reducing the need for capital expenditure by the network operator while enhancing the quality of call places through the network.

Although the present invention has been described in detail, those skilled in the art should understand that they can make various changes, substitutions and alterations herein without departing from the spirit and scope of the invention in its broadest form.

The invention claimed is:

1. In a communication network including at least one base station controller (BSC) and at least one mobile switching center (MSC) and at least one media gateway (MGw) in selective communication with the BSC over an interface that includes a packet-switched network, a method of admission control comprising:
   receiving in a BSC, a call setup request from a mobile station for a call;
   notifying an MSC of the call setup request;
   selecting by the MSC, an MGw for the call;
   determining by the BSC, a transmission quality towards the MGw through the packet-switched network; and
   determining whether to refuse the call setup request based on the transmission quality towards the MGw.

2. The method according to claim 1, wherein a predetermined BSC bandwidth limit above which the BSC may not transmit packets over the interface has been set, and further comprising, prior to notifying the MSC of the call setup request, determining whether the BSC bandwidth limit has been reached.

3. The method according to claim 2, wherein the BSC bandwidth limit is set dynamically.

4. The method according to claim 2, further comprising rejecting the call setup request if the BSC bandwidth limit has been reached.

5. The method according to claim 1, wherein determining the transmission quality includes determining a packet loss rate over the packet-switched network.

6. The method according to claim 5, wherein the packet loss rate is determined prior to notifying the MSC of the call setup request.

7. The method according to claim 6, wherein the packet loss rate is monitored for a plurality of MGws accessible by the BSC over an interface that is at least in part defined by the packet-switched network.

8. The method according to claim 1, further comprising determining by the MGw, the transmission quality towards the BSC through the packet-switched network.

9. The method according to claim 8, wherein determining of the transmission quality towards the BSC is performed when determined not to refuse the call setup request based on the transmission quality towards the MGw.

10. The method according to claim 8, further comprising determining whether to refuse the call setup request based on the transmission quality towards the BSC.

11. The method according to claim 10, further comprising selecting an alternate MGw upon refusal of the call setup request by the MGw.

12. The method according to claim 8, wherein a predetermined MGw bandwidth limit above which the MGw may not transmit packets over the interface has been set, and further comprising, prior to determining by the MGw of the transmission quality towards the BSC, determining whether the MGw bandwidth limit has been reached.

13. The method according to claim 12, wherein the MGw bandwidth limit is set dynamically.

14. The method according to claim 12, further comprising rejecting the call setup request if the MGw bandwidth limit has been reached.

15. A system for controlling traffic in a Global System for Mobile Communications (GSM) communication network, comprising:
 a base station controller (BSC) arranged to monitor transmission quality toward at least one media gateway (MGw) over an Internet protocol (IP) network, and further arranged, upon receiving a call setup request from a mobile station, to request selection of an MGw, and to determine whether to refuse the call setup request based on transmission quality toward the MGw over the IP network;
 a mobile switching center (MSC) arranged to select the MGw upon receiving the call setup request from the BSC; and
 the MGw arranged, upon being selected by the MSC, to determine transmission quality towards the BSC over the IP network, and further arranged to determine whether to refuse the call setup request based on the transmission quality towards the BSC over the IP network.

16. The system according to claim 15, wherein the BSC is further arranged to, prior to requesting selection of the MGw, determine whether to refuse the call setup request if a predetermined BSC transmission bandwidth limit has been reached.

17. The system according to claim 15, wherein the MGw is further arranged to determine whether to refuse the call setup request if a predetermined MGw transmission bandwidth limit has been reached.

18. A node for use in a communication network, the node being arranged to:
 receive a call setup request originated by a mobile station for a call;
 request selection of a media gateway (MGw) for handling the call;
 receive an MGw selection;
 determine transmission quality towards the MGw over an Internet protocol (IP) network; and
 determine whether to refuse the call setup request based on the transmission quality towards the MGw over the IP network.

19. The node according to claim 18, wherein the communication network is a Global System for Mobile Communications (GSM) communication network.

20. The node according to claim 18, wherein the node is a base station controller.

21. The node according to claim 18, further arranged to determine whether to refuse the call setup request based on whether a predetermined packet transmission bandwidth limit has been reached.

22. The node according to claim 21, wherein the determination whether to refuse the call setup request based on whether a predetermined packet transmission bandwidth limit has been reached is made prior to requesting selection of the MGw.

* * * * *